United States Patent [19]

Rowland et al.

[11] Patent Number: 5,848,412

[45] Date of Patent: Dec. 8, 1998

[54] USER CONTROLLED BROWSER IDENTIFICATION DISCLOSING MECHANISM

[75] Inventors: Bruce R. Rowland, St. Charles, Ill.; Lee G. Friedman, Alpharetta, Ga.

[73] Assignee: NCR Corporation, Dayton, Ohio

[21] Appl. No.: 752,421

[22] Filed: Nov. 19, 1996

[51] Int. Cl.$^6$ .................................................. G06F 17/30
[52] U.S. Cl. ............................................... 707/9; 707/10
[58] Field of Search ............................ 707/9, 103, 10; 902/21

[56] References Cited

U.S. PATENT DOCUMENTS

| | | | |
|---|---|---|---|
| 4,660,168 | 4/1987 | Grant et al. | 902/21 |
| 4,885,789 | 12/1989 | Burger et al. | 380/25 |
| 5,159,669 | 10/1992 | Trigg et al. | 395/159 |
| 5,185,515 | 2/1993 | Nishibe | 902/21 |
| 5,204,947 | 4/1993 | Bernstein et al. | 395/157 |
| 5,297,249 | 3/1994 | Bernstein et al. | 395/156 |
| 5,564,043 | 10/1996 | Siefert | 707/103 |
| 5,678,041 | 10/1997 | Baker et al. | 707/9 |
| 5,684,951 | 11/1997 | Goldman et al. | 707/9 |
| 5,692,124 | 11/1997 | Holden et al. | 707/9 |
| 5,706,507 | 1/1998 | Schloss | 707/9 |

*Primary Examiner*—Paul R. Lintz
*Assistant Examiner*—Ella Colbert
*Attorney, Agent, or Firm*—Ying Tuo

[57] ABSTRACT

A user-controlled information disclosure process for web user identification. In this process, a user information database, a BrowserID Client applet, and a BrowserID Website database are configured at a user terminal. The user information database contains a plurality of information records about a user's identification information and access levels for the respective information records. The BrowserID Website database contains the names of web sites and access levels for the respective web sites. In response to a request for user information from a web site, the BrowserID Client applet checks the existing access level in the BrowserID Website database for the web site (or negotiates a new level), and if appropriate, retrieves the access key granted by the web site to gain access to a controlled portion of a website.

12 Claims, 6 Drawing Sheets

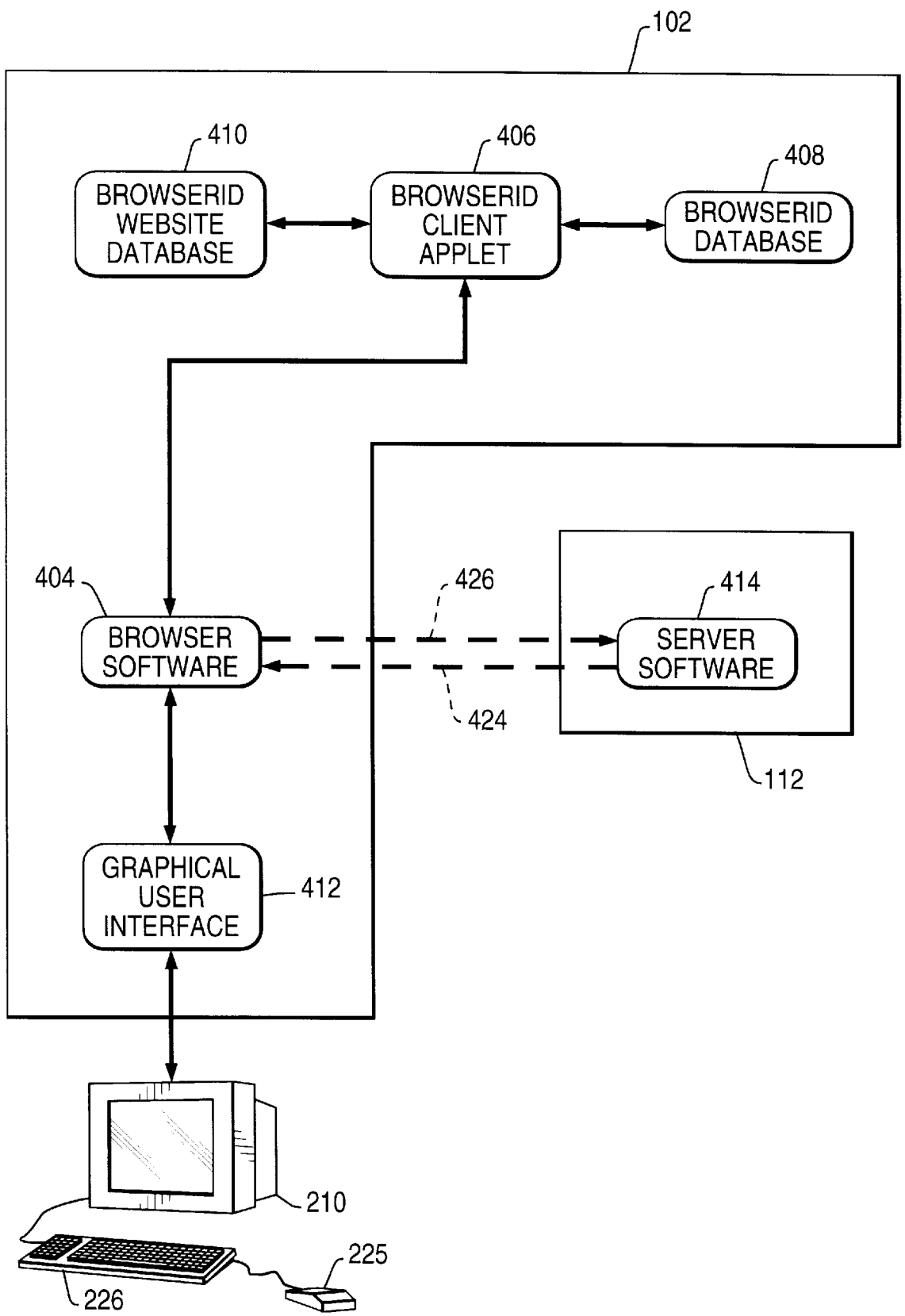

FIG. 5

BROWSERID DATABASE

| ID INFORMATION ITEM | LEVEL LIMIT |
|---|---|
| NAME | 1 |
| ADDRESS | 4 |
| PHONE | 4 |
| FAX | 4 |
| E – MAIL | 2 |
| DEMOGRAPHICS | 5 |
| SOCIAL SECURITY NO. | 7 |
| BANK ACCOUNT NO. | 9 |
| CREDIT CARD | 9 |
| MOTHER'S MAIDEN NAME | 8 |
| SOFTWARE SERIAL NO. | 7 |
| USER NAME | 10 |
| PASSWORD | 100 |

FIG. 6

BROWSERID WEBSITE DATABASE

| WEBSITE | ACCESS LEVEL |
|---|---|
| WWW.MICROSOFT.COM | 2 |
| WWW.WALMART.COM | 3 |
| WWW.SOFTWARE.NET | 5 |
| WEBSITE NAME | 3 |
| WEBSITE NAME | 5 |
| WEBSITE NAME | 6 |
| WEBSITE NAME | M |
| WEBSITE NAME | M + 2 |
| WEBSITE NAME | N |

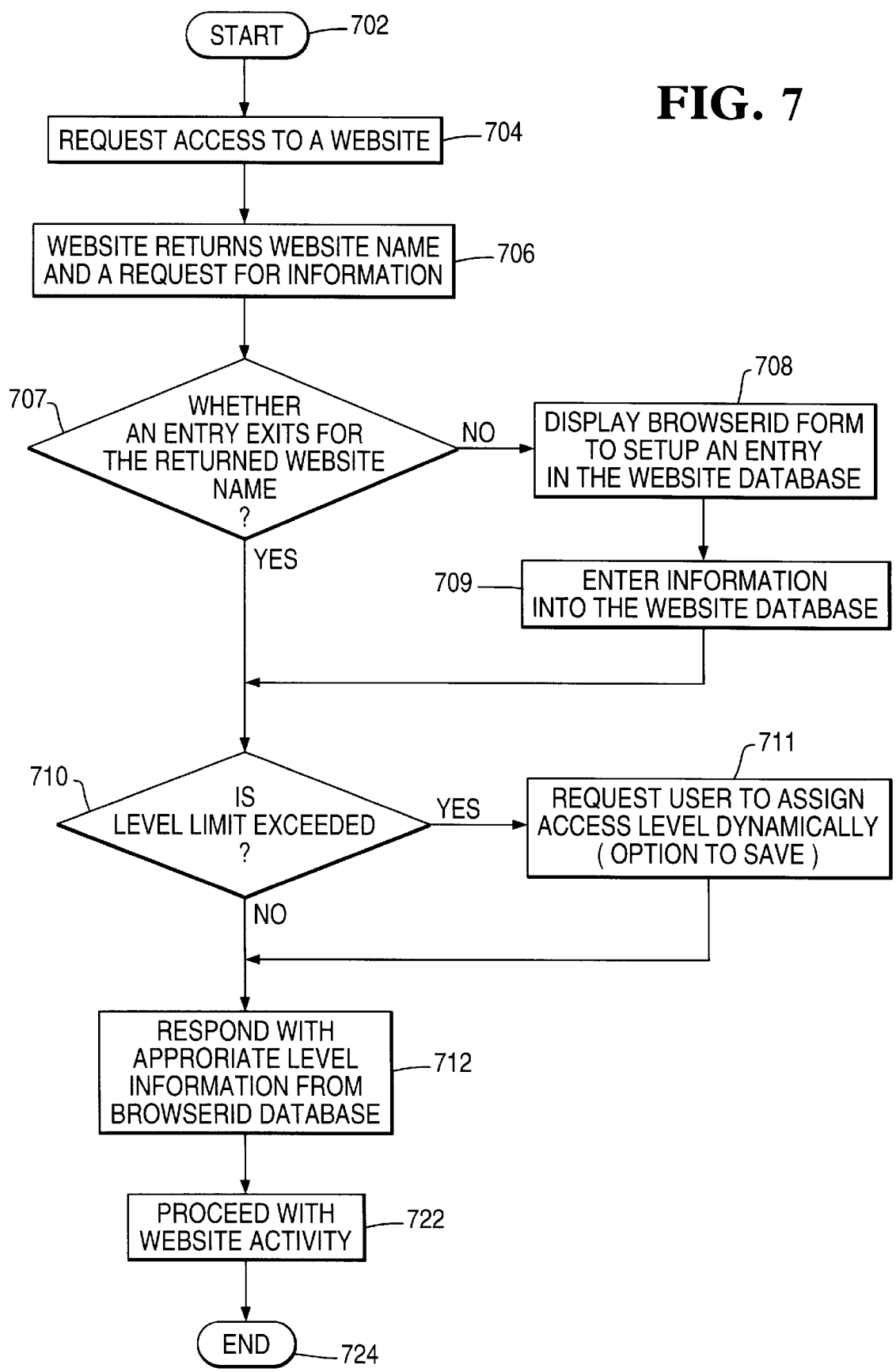

USER CONTROLLED BROWSER IDENTIFICATION DISCLOSING MECHANISM

BACKGROUND OF THE INVENTION

The present invention relates to a method and apparatus for providing user identification and transaction information to web sites in the process of getting access to the web sites.

It is known a user can retrieve information from world wide web sites (or web sites) via the Internet. More specifically, in retrieving desired information from a particular web site, the user sends a service request to the web site by using the web browser software at a user terminal. Upon receiving the service request, server software for the web site searches the information repository (organized as web pages) in the web site according to the request, and sends the desired information to the user terminal. Upon receiving the desired information, the web browser software displays the desired information in page format to the user.

To enhance the quality of, expand the market for, and provide new services for their web site services, many web sites require visitor identification and ask for personal identification and demographic information before processing received service requests. Further, the user may be required to provide a credit card or other sensitive financial information The user identification can be useful for a number of purposes: to authenticate web visitors, to selectively grant access privileges, to facilitate the administration and billing of marketable services over the Internet, to provide more focused responses, to build customer history database to facilitate the consequent repeating services, to collect marketing information, etc.

At the present time, several approaches have been developed to gather user identification information. One approach, used by Netscape Inc., is to "quietly" maintain a file within the client accessible to the browser software at user terminals. When a user terminal sends a service request to a web site, the browser software first provides to the server software the information within the file (known as "cookies.txt") that applies to the server's domain (Internet address). One problem with this approach is that users have little control (short of deleting the file or its entries) regardless of what types of web sites they are visiting. Another problem with this approach is the user identification may be incomplete, because the user identification gathered is limited to the hardware and software configuration at the user terminal. Current tracking facilities identify a web visitor by recognizing a unique identifier associated with the web visitor based on exchanges between the browser software and the server software. Usually, the identifier is the IP (Internet Protocol) address of the user terminal the visitor is using. This type of identification is problematic since many on-line service providers (such as America Online™ and CompuServe) assign an IP address per user session and will re-use the IP address for other users when it is released. It is also possible that corporate proxy servers hide (or mask) individual IP addresses for associated user terminals with their firewalls.

In another approach, many web sites have implemented a registration facility. After sending a service request to a web site, an HTML (Hyper Text Markup Language) form is presented to the web visitor, requesting the visitor to fill in the form to provide information such as name, e-mail address, phone number, business affiliation, etc. Often the registration is accompanied by the issuance of personal ID and password for use in the next visit to the web site, typically giving the visitor access to pages of information and services not otherwise available. Such a registration process is cumbersome and inconvenient for a web site user. The format of the identification information is designed to satisfy each individual web site and may not be consistent to the user. It is quite possible the information being requested is not handy at the moment when the user is visiting a web site. If multiple personal IDs and pass words are issued, it is difficult for the user to remember the IDs and passwords and match them with appropriate web sites.

To strike a balance between the users' privacy and the necessity to have user identification information, Daniel W. Connolly made two proposals in July of 1995 ("Request-ID header field" and "Anonymous Authentication"). These two proposals focus on per-session tracking and thus are not amenable to establishing a long term relationship between a web site provider and customer, or to providing insight to a user's identification for demographic purposes. A third proposal by Daniel W. Connolly suggests establishing an "electronic business card" through the use of HTML forms and ID field names that would facilitate the filling-in of common registration forms by having standardized field names that could automatically be filled-in by the browser. The browser user would have the opportunity to not submit the information or to edit it prior to submitting it. A problem with this proposal is the negative impact that it would have on caching performed by proxy servers since the ID information would be transmitted via URLs (Uniform Resource Locators) that are the keys to cached web pages.

Therefore, there exists a need to provide a method and apparatus that can provide user identification information to web sites under users' control.

There exists another need to provide a method and apparatus that can provide user identification information to web sites with control, consistency, efficiency, and convenience to the users.

The present invention meets these needs.

SUMMARY OF THE INVENTION

In one aspect, the present invention provides a method for providing information to a web site at a user terminal. The method comprises the steps of:

at the user terminal,
(a) establishing a plurality of information records with respective access level indicators for indicating access levels;
(b) receiving a request from the web site with an access level being associated with the web site;
(c) checking the access level for the web site; and
(d) retrieving information records based on said access level indicators associated with the information records and the access level associated with the web site.

In another aspect, the present invention provides a method for providing information to a web site at a user terminal. The method comprises the steps of:

at the user terminal,
(a) establishing a plurality of first type of records containing access levels associated with the web sites;
(b) establishing a plurality of second type of records, each one of said second type of records containing user information and access level associated with said one record;
(c) receiving a request from one of the web sites;
(d) checking access level for the web site from said first type of records; and (e) retrieving information from said second type of records based on the access level associated with the web site and the access levels associated with said second type of records.

The present invention also provides respective apparatuses corresponding to the methods mentioned above.

BRIEF DESCRIPTION OF THE DRAWING

The purpose and advantages of the present invention will be apparent to those skilled in the art from the following detailed description in conjunction with the appended drawing, in which:

FIG. 4 shows a software block diagram for a representative one of the user terminals, and for a representative one of the web sites, shown in FIG. 1, in accordance with the present invention;

FIG. 5 shows BrowserID database of FIG. 4 in greater detail, in accordance with the present invention;

FIG. 6 shows BrowserID website database of FIG. 4 in greater detail, in accordance with the present invention; and FIG. 7 shows a flowchart illustrating the steps of disclosing user information to a web site, in accordance with the present invention.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
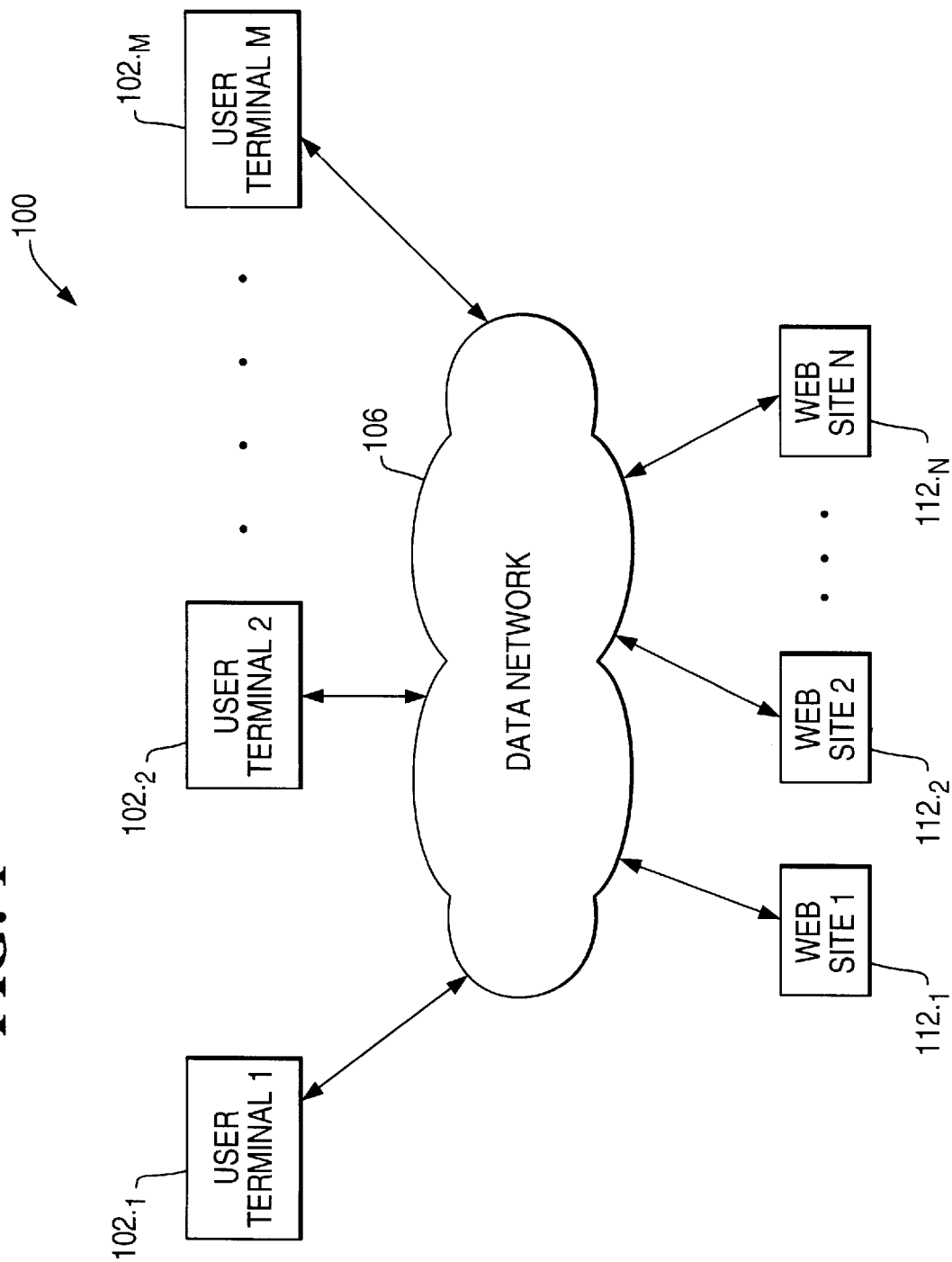
FIG. 1 shows an exemplary data network configuration, in accordance with the present invention.

Referring to FIG. 1, there is shown an exemplary data network configuration 100, in accordance with the present invention.

As shown in FIG. 1, the data network configuration includes a plurality of user terminals $102._1$, $102._2$, ..., $102._M$, a plurality of web sites $112._1$, $112._2$, ..., $112._N$, and a data network 106. Each of the user terminals can get access to the web sites via data network 106.

Figure 2:
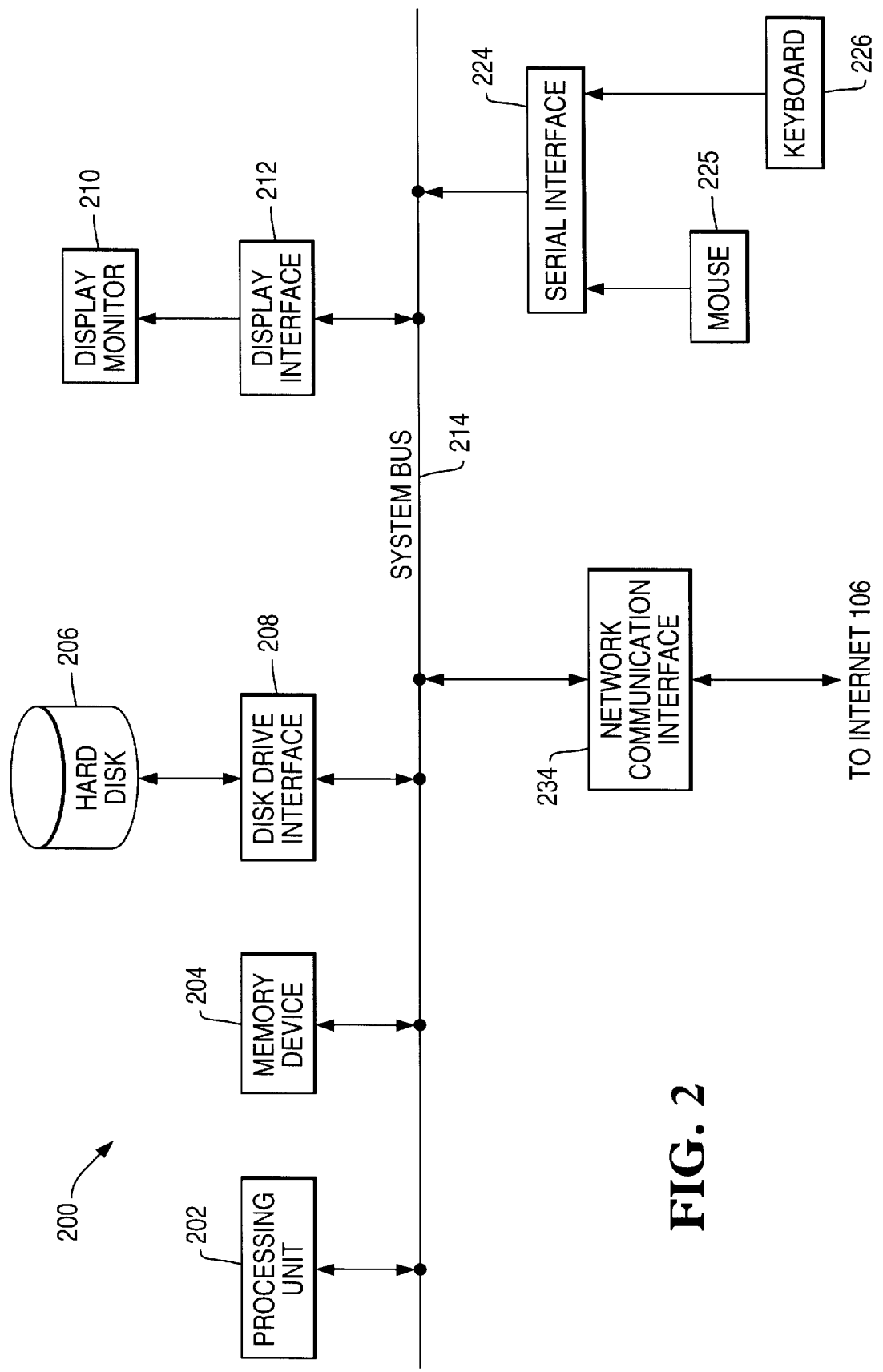
FIG. 2 shows a hardware block diagram of a representative one of the user terminals of FIG. 1, in accordance with the present invention.

Referring to FIG. 2, there is shown a hardware block diagram of a representative user terminal for user terminals $102._1$, $102._2$, ..., and $102._M$, in accordance with the preset invention.

As shown in FIG. 2, the user terminal comprises a processing unit 202, a memory device 204, a hard disk 206, a disk drive interface 208, a display monitor 210, a display interface 212, a serial interface 224, a mouse 225, a keyboard 226, a network communication interface 234, and a system bus 214.

Hard disk 206 is coupled to disk drive interface 208; display monitor 210 is coupled to display interface 212; and mouse 225 and keyboard 226 is coupled to serial interface 224. Coupled to system bus 214 are: processing unit 202, memory device 204, disk drive interface 208, display interface 212, serial interface 224, and network communication interface 234.

Memory device 204 is able to store programs, including instructions and data). Operating together with disk drive interface 208, hard disk 206 is also able to store programs. However, memory device 204 has faster access speed than hard disk 206, while hard disk 206 has higher capacity than memory device 204.

Operating together with display interface 212, display monitor 210 is able to provide visual interface between programs being executed and a user.

Operating together with serial interface 224, mouse 225 and keyboard 226 are able to provide inputs to the user terminal.

Network communication interface 234 is able to provide an interface between the user terminal and data network 106. More specifically, all software function blocks as shown in FIGS. 2 and 3 get access to data network 106 via network communication interface 234 in compliance with pre-determined network protocols.

Processing unit 202 has access to memory device 204 and hard disk 206, and is able to control operations of user terminal $102._1$ or $102._2$ by executing programs stored in memory device 204 or hard disk 206. Processing unit 202 is also able to control the transmissions of programs and data between memory device 204 and hard disk 206.

Figure 3:
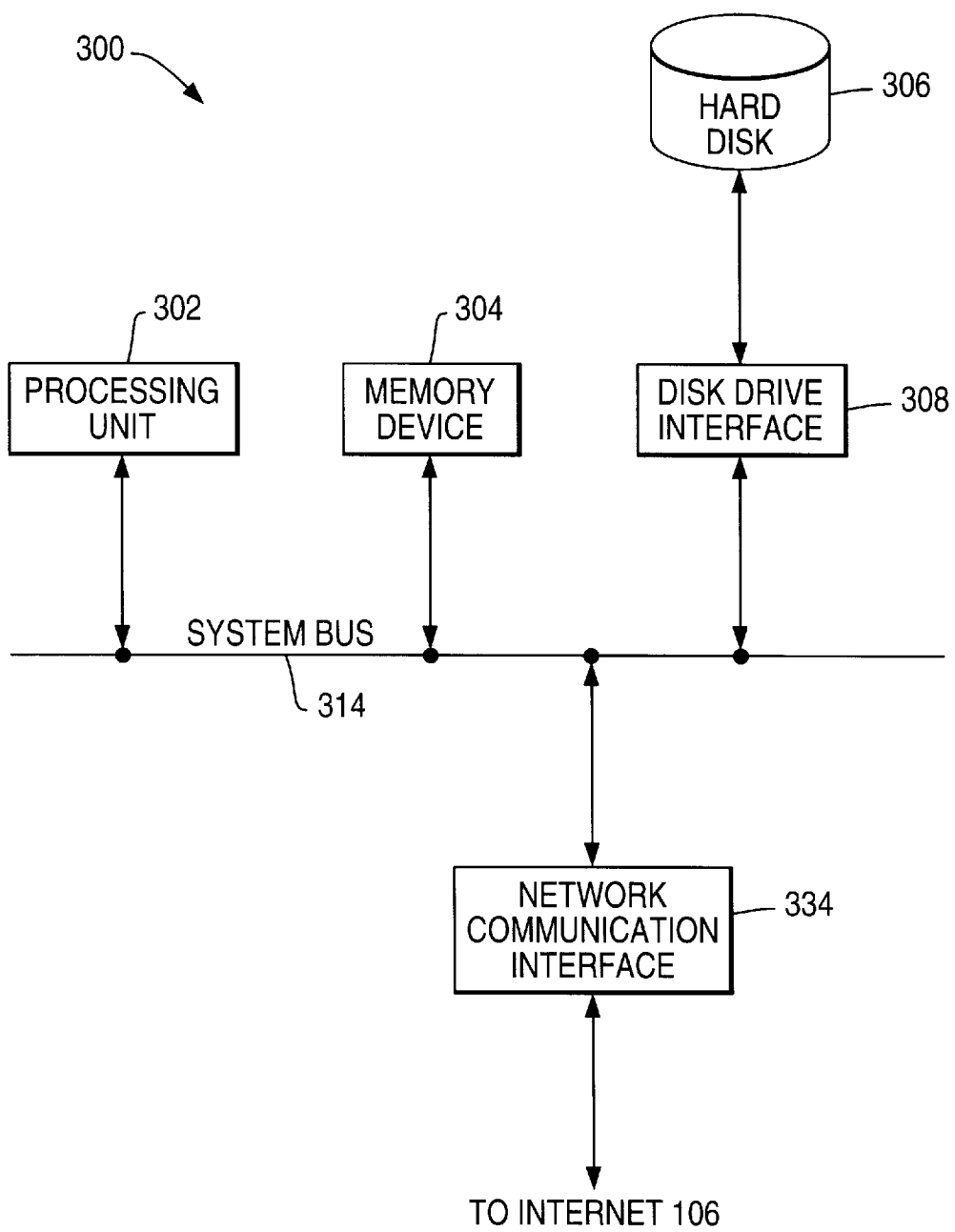
FIG. 3 shows a hardware block diagram for a computer system, which is able to support any one of the web sites of FIG. 1, in accordance with the present invention.

Referring to FIG. 3, there is shown a hardware block diagram for a computer system 300, which is able to support any of the web sites $112._1$, $112._2$, ..., $112._N$, in accordance with the preset invention.

As shown in FIG. 3, computer system 300 comprises a processing unit 302, a memory device 304, a hard disk 306, a disk drive interface 308, a network communication interface 334, and a system bus 314.

Hard disk 306 is coupled to disk drive interface 308. Coupled to system bus 314 are: processing unit 302, memory device 304, disk drive interface 308, and network communication interface 334.

Memory device 304 is able to store programs (including instructions and data). Operating together with disk drive interface 308, hard disk 306 is also able to store programs. However, memory device 304 has faster access speed than hard disk 306, while hard disk 306 has higher capacity than memory device 304.

Network communication interface 334 is able to provide an interface between computer 300 and data network 106. More specifically, computer 300 gets data network 106 via network communication interface 434 in compliance with pre-determined network protocols.

Processing unit 302, which may include one or more processors, has access to memory device 304 and hard disk 306, and is able to control operations of computer system 300 by executing programs stored in memory device 304 or hard disk 306. Processing unit 302 is also able to control the transmissions of programs and data between memory device 304 and hard disk 306.

Referring to FIG. 4, there are shown a software block diagram for a representative user terminal of the user terminals $102._1$, $102._2$, ..., $102._M$, and for a representative one of the web sites $112._1$, $112._2$, ..., $112._N$, in accordance with the present invention.

As shown in FIG. 4, the user terminal includes five software function blocks, namely: browser software 404, BrowserID client applet 406, BrowserID database 408, BrowserID web site database 410, and user graphical interface 412. Web site 112 includes sever software 414.

Browser software 404 is able to formulate and send requests to web sites, and to display the information retrieved from the web sites. Browser software is also able to receive user ID information requests from web sites.

BrowserID database 408 contains user information.

BrowserID client applet 406 is able to retrieve the user information from BrowserID database 408 and passes it to browser software 404. However, BrowserID client applet 406 will not pass any user information from BrowserID database 408 without the explicit permissions the user set in the BrowserID database 408 and comparing them to the defined set of permissions in the BrowserID website database 410 for that web site 414. If, in response to a request for user ID information from a web site, no permission is granted to the web site, the browser software 404 will alert the user to define a permission that will be entered into the BrowserID website database 410. BrowserID client applet 406 is designed (programmed in Java for example) such that it can be executed (or interpreted) by any browser.

BrowserID website database 410 contains the names of web sites and the degree of identification information to be shared.

Graphical User Interface 412 is able to provide an interface between a user and software function blocks, including BrowserID client applet 406 and BrowserID database 408. Through display monitor 210, keyboard 226 and mouse 225, a user is able to initialize and update the BrowserID database 408 and the BrowserID website database 410, and to send control signals to BrowserID client applet 406.

Server software 414 is able to process the requests for information from browsers and return the information to the browsers via HTTP, FTP, Gopher or other Internet information transfer protocols.

When a user wants to visit web site 112, he/she can use keyboard 226 or mouse 225 to activate browser software 404 to send a service request to the web site, as indicated by line 426. Upon receiving the service request, server software 414 for the web site sends a request for user ID information, as indicated by line 424 which will invoke the execution on the user terminal of Browser ID Client Applet 406.

Referring to FIG. 5, there is shown the BrowserID database 408 in greater detail, in accordance with the present invention.

As shown in FIG. 5, BrowserID information database 408 contains rows of ID records, each with two fields, namely: a single ID Information Item followed by an information sharing Level Limit field. By way of one example, in the first record, the ID Information Item field contains a user's full name; the Level Limit field contains a numerical value, indicating that the name will be revealed to a web server of a web site if and only if the user chooses to provide that level of information access for that web server. If so, that sharing level will be indicated within the BrowserID website database 410 by the Level Limit Field. By way of another example, in the seventh record, the ID Information Item field contains social security number; the Level Indicator Field contains 7, indicating that the social security number will only be transmitted to the web server of a web site if and only if the user specifies a web server's access level within the BrowserID website database 410 of value 7 or higher.

In the embodiment shown in FIG. 5, it is assumed that the greater the numerical value in the Level Limit field, the higher is the access level. It can be designed the other way around, that is: the smaller of the numerical value in the Level Limit field, the higher is the access level. This means that a record will be revealed to a web server of a web site if and only if the web server's access level from the BrowserID website database 410 is smaller than or equal to the Level Limit Field associated to that record.

Referring to FIG. 6, there is shown BrowserID website database 410 in greater detail, in accordance with the present invention.

As shown in FIG. 6, BrowserID website database 410 is comprised of records with 2 fields. The first field is the public URL for the site. The second field contains the access level assigned to it by the user when information sharing level access was negotiated among the BrowserID Client Applet and the web site server. This information is stored in the BrowserID website database 410 and is indexed by the BrowserID database 408 under control of the BrowserID applet 406.

Referring to FIG. 7, there is shown a flowchart illustrating the steps of disclosing user information to a web site, in accordance with the present invention.

In step 704, a user sends a service request to one of the web sites ($112._1, 112._2, \ldots, 112._N$), that requires access from one of the user terminals ($102._1, 102._2, \ldots, 102._M$), to request an access to the web site.

In step 706, server software 414 for the web site returns the web site name that will provide the service requested by the user and a request for information to BrowserID Client applet 406. In its request, the server software (414) may specify the information items it needs, such as name, address, phone number, . . . , etc.

In step 707, BrowserID Client applet 406 determines whether an entry exists for the returned web site name in the BrowserID Website database 410. If an entry exists for the returned web site name, the operation is led to step 710. If no entry exists for the returned web site name, the operation is led to step 708.

In step 708, to negotiate a Level Limit to share information with the web site, BrowserID Client applet 406 presents an HTML form, including the information items specified by sever software 414, to the user.

Following step 708, in step 709, BrowserID Client Applet 406 creates an entry in BrowserID database 408 for the returned web site name, and the user selects a Level Limit, in reference to the HTML form. The user may choose to the Level Limit that complies with the information items specified by the web site, or choose to grant a lower Level Limit. The operation is then led to step 710.

In step 710, BrowserID Client applet 406 determines whether any of the information items specified by the web site exceed the Level Limit previously granted to the web site, by using the information stored in BrowserID database 408 and BrowserID website database 410.

In step 710, if the Level Limit previously granted is not exceeded, the operation is led to step 712. If the Level Limit is exceeded, the operation is led to step 711, in which BrowserID Client applet 406 presents an HTML form to the user, asking the user to permit the increase in the Level Limit to the web site and asking if the user wants this to be a permanent update. After the user responds (either increases the Level Limit, or keeps the Level Limit previously granted unchanged), the operation is then led to step 712.

In step 712, BrowserID Client applet 406 responds to the server software with the information fields from BrowserID database 408, according to the Level Limit granted to the web site.

In step 722, server software 414 processes the requests from browser software 404, to proceed with web site activity.

Preferably, in the embodiment shown in FIGS. 2 and 4, the software function blocks for a user terminal are stored in memory device 204 or hard disk 206 and executed by processing unit 202. In the embodiment shown in FIG. 3, server software is stored in memory 304 and executed by processing unit 302.

It should be appreciated that the present invention provides a mechanism for users to control their own identification information. As such, the present invention requires that the BrowserID Client Applet which collects and delivers user information for web sites must be permanently associated with the client's browser; an applet that is downloaded from a website server cannot be trusted to cooperate with the user's desire to control access to personal information.

The present invention has the advantages in that: (a) a user can control ID information disclosure at different level; (b) it is convenient for a user to provide the ID information; (c) it creates a mechanism to provide a standardized mechanism and format to provide ID information; and (d) web servers get complete and accurate ID information (if disclosed).

While the invention has been illustrated and described in detail in the drawing and foregoing description, it should be understood that the invention may be implemented through alternative embodiments within the sprit of the present invention. Thus, the scope of the invention is not intended to be limited to the illustration and description in this specification, but is to be defined by the appended claims.

What is claimed is:

1. A method for providing information to a web site at a user terminal, comprising the steps of:

at the user terminal,
(a) establishing a plurality of information records with respective access level indicators for indicating access levels;
(b) receiving a request from the web site with an access level being associated with the web site;
(c) checking the access level for the web site; and
(d) retrieving information records based on said access level indicators associated with the information records and the access level associated with the web site.

2. The method of claim 1, wherein in step (a), said access level indicators indicate different access levels.

3. The method of claim 2, in said step (a) the access level associated with the web site is defined by the user terminal.

4. A method for providing information to a plurality of web sites at a user terminal, comprising the steps of:

at the user terminal,
(a) establishing a plurality of first type of records containing access levels associated with the web sites;
(b) establishing a plurality of second type of records, each one of said second type of records containing user information and access level associated with said one record;
(c) receiving a request from one of the web sites;
(d) checking access level for the web site from said first type of records; and
(e) retrieving information from said second type of records based on the access level associated with the web site and the access levels associated with said second type of records.

5. The method of claim 4, wherein in step (a), said access levels are defined by the user terminal.

6. An apparatus for providing information to a web site at a user terminal, comprising:

at the user terminal,
(a) a receiver circuit for receiving a request from the web site with an access level being associated with the web site; and
(b) a processor logic for checking the access level for the web site; and for retrieving information based on the access level associated with the web site.

7. The apparatus of claim 6, the access level associated with the web site is defined at the user terminal.

8. An apparatus for providing information to a web site at a user terminal, comprising:

at the user terminal,
(a) receiver circuit for receiving a request from the web site with an access level being associated with the web site;
(b) a storage medium for storing a plurality of information records with respective access level indicators for indicating access levels; and
(c) a processor logic for checking the access level for the web site; and for retrieving information records based on said access level indicators associated with the information records and the access level associated with the web site.

9. The apparatus of claim 8, wherein said access level indicators indicate different access levels.

10. The apparatus of claim 9, wherein the access level associated with the web site is defined at the user terminal.

11. An apparatus for providing information to a plurality of web sites at a user terminal, comprising:

at the user terminal,
(a) a first storage medium for storing a plurality of first type of records containing access levels associated with the web sites;
(b) a second storage medium for storing a plurality of second type of records, each one of said second type of records containing user information and access level associated with said one record;
(c) a receiver circuit for receiving a request from one of the web sites; and
(d) a processor logic for checking access level for the web site from said first type of records, and for retrieving information from said second type of records based on the access level associated with the web site and the access levels associated with said second type of records.

12. The apparatus of claim 11, wherein said access levels are defined by the user terminal.

* * * * *